United States Patent [19]

Oppen

[11] 4,295,899

[45] Oct. 20, 1981

[54] PROCESS FOR COATING IRON AND STEEL

[75] Inventor: Dieter Oppen, Rodgau, Fed. Rep. of Germany

[73] Assignee: Hooker Chemicals & Plastics Corp., Madison Heights, Mich.

[21] Appl. No.: 122,403

[22] Filed: Feb. 19, 1980

[30] Foreign Application Priority Data

Feb. 23, 1979 [DE] Fed. Rep. of Germany ....... 2907093

[51] Int. Cl.$^3$ ................................................. C23F 7/10
[52] U.S. Cl. .................................... 148/6.16; 106/84; 427/126.1; 427/126.3; 427/397.8
[58] Field of Search .................. 106/84; 148/6.16; 427/126.1, 397.8, 126.3

[56] References Cited

U.S. PATENT DOCUMENTS

| 3,138,471 | 6/1964 | Wygant | 106/84 |
| 3,178,321 | 4/1965 | Satterfield | 148/13.1 |
| 3,262,793 | 7/1966 | Neely et al. | 106/84 |
| 3,308,414 | 3/1967 | Ostander et al. | 106/48 |
| 3,544,396 | 12/1970 | Taylor | 148/111 |

*Primary Examiner*—Ralph S. Kendall
*Attorney, Agent, or Firm*—Arthur E. Kluegel; Richard P. Mueller

[57] ABSTRACT

A composition and process are useful for imparting a coating to an iron or steel surface which exhibits decorative and improved electrical and corrosion resistance properties. The composition contains an alkali silicate water-glass, an alkali polyphosphate and insoluble chromic oxide pigment. The composition is applied to the surface by conventional techniques and baked in place.

5 Claims, No Drawings

PROCESS FOR COATING IRON AND STEEL

BACKGROUND OF THE INVENTION

The invention relates to an agent for producing non-metallic coatings on iron or steel, based upon an alkali-silicate-polyphosphate sol with a content of inorganic pigment; and to a method for producing non-metallic coatings on iron or steel.

Various methods are known for applying nonmetallic coatings to metal surfaces, especially for purposes of electrical insulation. In addition to phosphating processes, especially those based upon alkaline-earth phosphates, in which the solution is baked-on at a high temperature (German Pat. Nos. 10 30 377, 10 90 916), there are processes in common use which produce heat-resistant coatings by applying to the metal surface aqueous sodium-silicate solutions and a metal oxide, e.g. cobalt and/or nickel oxide; the coating is dried and then baked-on (U.S. Pat. No. 2,711,974).

U.S. Pat. Nos. 3,213,302 and 3,562,011 suggest compositions useful for imparting electrical resistance but neither recognizes the advantage obtained by employing an alkali water-glass, polyphosphate and insoluble chromic oxide pigment.

The disadvantage of known methods using water-glass is that the coatings thereby produced pick up moisture. The consequence of this is a considerable impairment of insulating action and mechanical properties, such as adhesion.

One known agent and method for producing nonmetallic layers on sheet-iron and steel, which is intended to overcome these known disadvantages, consists of an alkali-silicate-polyphosphate sol with specific molar ratios as regards silicate, alkali-oxide and polyphosphate, the application of which is described in German Disclosure Text 27 25 619. The sol may also contain, among other things, inorganic oxygen-containing boron compounds, saponifiable polyacrylate polymers, inorganic pigments and/or inorganic fillers. The pigments used are iron-oxide or lithopone, the fillers mica or calcium carbonate.

Although the non-metallic layers produced by the foregoing methods have satisfactory resistance to moisture, they have the disadvantage of unsatisfactory electrical resistnce after high-temperature annealing (usually above 750° C.), such as is usually carried out for the purpose of improving the magnetic properties of stampings.

It is the purpose of the invention to provide an agent and a method for producing non-metallic coatings on iron or steel which lacks known disadvantages, especially those mentioned above, which can be produced without high cost and can be used to form layers.

SUMMARY OF THE INVENTION

This purpose is achieved in that the agent, of the type mentioned at the beginning hereof, is further developed, according to the invention, so that it contains chromic oxide pigment ($Cr_2O_3$) in an amount corresponding to a $Cr_2O_3:P_2O_5$ (equivalent)$:SiO_2$ molar ratio of 0.005 to 1.5:0.005 to 0.1:1.

DETAILED DESCRIPTION OF THE INVENTION

As indicated in the example of embodiment, $Cr_2O_3$ provides, surprisingly enough, a considerably higher resistance than other known pigments. An additional content of comparably smaller amounts of iron-oxide and/or zinc-sulphide impairs the electrical resistance, and these should therefore be avoided as far as possible.

The agent according to the invention should also be as free as possible from organic components, since these usually decompose during the conventional annealing of the coated metals, thus impairing the insulating properties of the layers.

In order to avoid, in particular, cement-like deposits and incrustations in the treatment equipment, it is desirable to use agents which also contain barium-sulphate ($BaSO_4$) in an amount corresponding to a $BaSO_4:SiO_2$ molar ratio of 0.05 to 1.0:1.

As regards rheological properties, it is also desirable to use agents containing alkali-polyphosphate, preferably alkali-hexametaphosphate, in an amount corresponding to a $P_2O_5:SiO_2$ molar ratio of 0.005 to 0.1:1.

The coatings obtained are particularly uniform, smooth and adherent if the $Cr_2O_3$ and $BaSO_4$, if any, in the agent has an average particle size of max. 5 $\mu$m, preferably max. 1 $\mu$m.

The preferred agent to be used contains:
30 to 70% by weight of alkali-silicate (water-glass)
0.5 to 1.5% by weight of polyphosphate
2 to 25% by weight of $Cr_2O_3$ and
10 to 30% by weight of $BaSO_4$.

The quantity indicated for alkali-silicate relates to commercial potassium water-glass having a density of 1.28 g/cm$^3$ and containing 8.7% by weight of $K_2O$ and 21% by weight of $SiO_2$. However, it is also possible to use water-glasses of similar composition, i.e. with an alkali-oxide$:SiO_2$ molar ratio of about 1:3.0 to 4.0. Preferred water-glasses have a potassium-oxide base.

The invention also relates to a method for producing non-metallic coatings on iron or steel, in which the agent defined above is applied at a viscosity of between 400 and 1000 mPa.S, preferably between 600 and 800 mPa.S (as measured at 20° C.), and is then baked-on at a temperature of between 150° and 500° C., preferably between 250° and 350° C.

According to one advantageous development of the invention, the agent is applied to sheet- or strip-metal, by means of a roller-coating machine, in a wet-film thickness of between 2 and 20 $\mu$m.

The agents according to the invention are particularly suitable for producing electricallyinsulating layers in sheet and strip. However, the said layers may also be applied to provide protection against corrosion, or for decorative purposes.

Not only are these layers noted for their high electrical resistance, but they are also heat-resistant up to 900° C.

The invention is described hereinafter in greater detail and by way of example.

Cleaned test-sheets of cold-rolled steel (St 14) were coated, using a 30 $\mu$m rake (made by Erichsen) with the following agents marked 1 to 5. The coating was then baked on for 60 seconds in an ambient-air temperature of 340° C. The layer-thicknesses obtained were between 7 and 10 $\mu$m.

The following agents were used:
1. 2% By Weight $Cr_2O_3$
   35% By Weight $BaSO_4$
   55% By Weight Commercial Water-Glass (21% By Weight $SiO_2$, 8.7% By Weight $K_2O$)
   2% By Weight Sodium Tripolyphosphate
   6% By Weight Water 2. 10% By Weight $Cr_2O_3$
   21% By Weight $BaSO_4$
   60% By Weight Potassium Water-Glass (21% By Weight $SiO_2$, 8.7% By Weight $K_2O$)
   0.5% By Weight Sodium Hexametaphosphate
   8.5% By Weight Water
3. 22% By Weight $Cr_2O_3$
   9% By Weight $BaSO_4$
   65% By Weight Potassium Water-Glass (21% By Weight $SiO_2$, 8.7% By Weight $K_2O$)
   1% By Weight Sodium Tripolyphosphate
   3% By Weight Water
4. 35% By Weight Lithopone (30% By Weight Zinc-Sulphide, 70% By Weight $BaSO_4$)
   2% By Weight Iron-Oxide
   56% By Weight Potassium Water-Glass (21% By Weight $SiO_2$, 8.7% By Weight $K_2O$)
   1% By Weight Sodium Hexametaphosphate
   6% By Weight Water
5. 10.5% By Weight ZnS
   24.5% By Weight $BaSO_4$
   2% By Weight Iron-Oxide
   56% By Weight Potassium Water-Glass (21% By Weight $SiO_2$, 8.7% By Weight $K_2O$)
   1% By Weight Sodium Hexametaphosphate
   6% By Weight Water The adhesion of the layers thus produced was treated by the mandrel-bending test according to ASTM 522-60. All layers showed satisfactory adhesion.

In order to determine the electrical properties of the layers, additional coated test sheets were annealed for 30 minutes, at 850° C., in an atmosphere consisting of 30% by volume of hydrogen and 70% by volume of nitrogen. Subsequent measurement of the specific resistance (according to ASTM D 344-64) gave the following values:

"A"
For Agent 1 34$\Omega$.cm$^2$
For Agent 2 58$\Omega$.cm$^2$
For Agent 3 49$\Omega$.cm$^2$
For Agent 4 2.5$\Omega$.cm$^2$
For Agent 5 0.6$\Omega$.cm$^2$ Comparison shows that layers produced with agents 1 to 3 according to the invention possess resistance values which are higher by 1 to 2 powers of ten than those produced with known agents 4 and 5.

What is claimed is:

1. A process for producing non-metallic electrical resistance coatings on the surface of iron or steel, comprising contacting a composition free of organic components and comprising an alkali silicate water-glass, an alkali polyphosphate and insoluble $Cr_2O_3$ pigment wherein the molar ratio of $Cr_2O_3$:$P_2O_5$ (equivalent):$SiO_2$ is 0.005 to 1.5:0.005 to 0.1:1 with the surface at a viscosity of between 400 and 1000 mPa.S, (as measured at 20° C.), and baking the thus treated surface at a temperature of between 150° and 500° C.

2. The process of claim 1, wherein the composition is contacted with the surface by means of a roller-coating machine, to a wet-film thickness of between 2 and 20 $\mu$m.

3. The process of claim 1 wherein the composition additionally contains barium sulphate pigment in an amount corresponding to a $BaSO_4$:$SiO_2$ molar ratio of 0.05 to 1.0:1.

4. The process of claim 1 wherein the polyphosphate is a hexametaphosphate.

5. The process of claim 1 wherein the composition contains:
   30 to 70% by weight of alkali-silicate (water-glass)
   0.5 to 1.5% by weight of polyphosphate
   2 to 25% by weight of $Cr_2O_3$ and
   10 to 30% by weight of $BaSO_4$.

* * * * *